U. L. BARNES.
TRANSMISSION MECHANISM AND CASING.
APPLICATION FILED MAR. 14, 1918.

1,331,139.

Patented Feb. 17, 1920.

Inventor.
Uriah L. Barnes.
by A. B. Bowman
Attorney.

UNITED STATES PATENT OFFICE.

URIAH L. BARNES, OF SAN DIEGO, CALIFORNIA.

TRANSMISSION MECHANISM AND CASING.

1,331,139.            Specification of Letters Patent.      Patented Feb. 17, 1920.

Continuation of application Serial No. 194,365, filed October 2, 1917. This application filed March 14, 1918.
Serial No. 222,456.

*To all whom it may concern:*

Be it known that I, URIAH L. BARNES, a citizen of the United States, residing at San Diego, in the county of San Diego and State of California, have invented certain new and useful Improvements in Transmission Mechanism and Casings, of which the following is a specification.

My invention relates to a transmission mechanism and casing for transmitting power from the engine to the wheels of an automobile, more particularly to a casing for inclosing the change speed gears and clutch mechanism and is for the purpose of replacing the ordinary planetary transmission now in use and being a continuation of my application for transmission mechanism, filed October 2, 1917, Serial No. 194,365, and the objects of my invention, are: first, to provide a three-speed transmission mechanism that is so constructed that it will fit into the ordinary Ford transmission casing and replace the ordinary planetary transmission; second, to provide a three-speed transmission mechanism of compact form to be used in connection with said casing; third, to provide a combined mechanism and casing of this class which is simple and economical of construction, durable, easy to install in the place of the ordinary planetary transmission casing, easy to operate and which will not readily deteriorate or get out of order.

Figure 1:
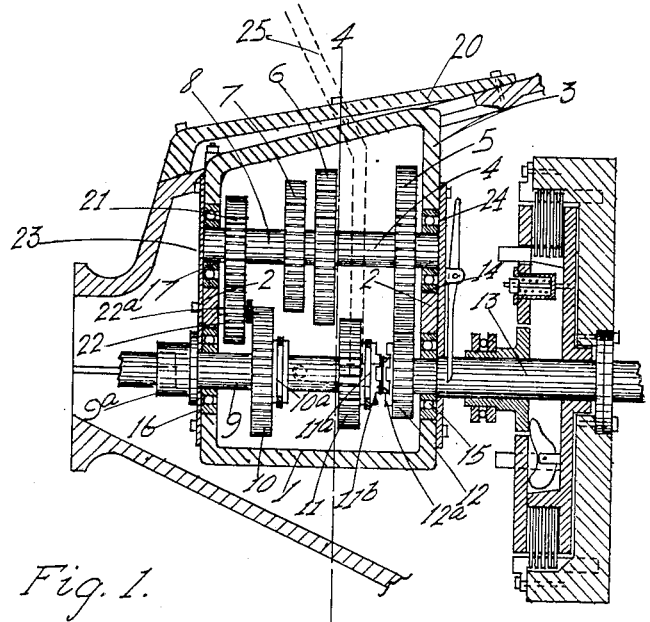
Figure 2:
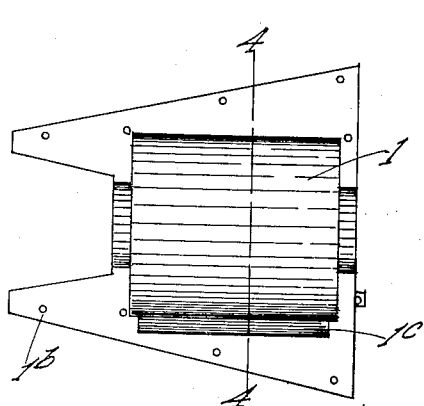
Figure 4:
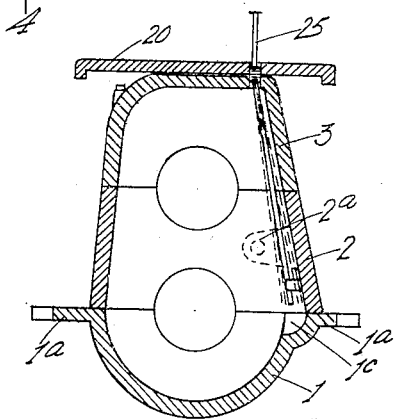
Figure 3:
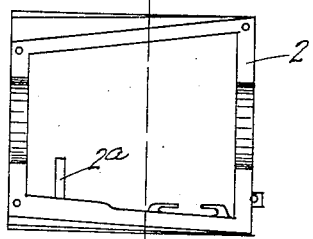
Figure 5:
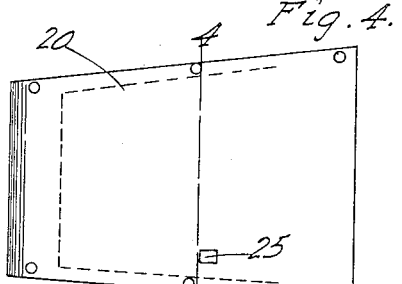

With these and other objects in view as will appear hereinafter my invention consists of certain novel features of construction, combination and arrangement of parts as will be hereinafter described in detail and particularly set forth in the appended claims, reference being had to the accompanying drawings and to the characters of reference thereon which form a part of this specification, in which:

Figure 1 is a fragmentary sectional view of the ordinary Ford transmission casing showing my casing therein in section and showing the transmission mechanism therein, partly in elevation and partly in section, to facilitate the illustration: Fig. 2, is a bottom view of my transmission casing: Fig. 3, is a top view of the intermediate section of said casing: Fig. 4 is a sectional view through 4—4 of Figs. 1, 2, 3 and 5, and Fig. 5 is a top view of the cover plate which fits over the hole in the upper side of the ordinary Ford transmission casing.

Similar characters of reference refer to similar parts throughout the several views of the drawings.

The casing members 1, 2, and 3, counter shaft 4, gear 5, gear 6, gear 7, spacers 8, rear drive shaft 9, low and reverse sliding gear 10, high and intermediate gear 11, high and main drive gear 12, front drive shaft 13, bearings 14, 15, 16, and 17, casing cover 20, reverse gear 21, reverse pinion 22, counter shaft and plate 23, counter shaft end plate 24, and shifting lever 25, constitute the principal parts of my transmission mechanism and casing.

The casing member 1 is shaped as shown best in Figs. 1, 2, and 4 of the drawings. It is provided with outwardly extending flanges $1^a$ adapted to rest on the top edge of the lower half of the conventional transmission casing and be secured thereto by bolts through the holes $1^b$ and secured on the top of this casing member 1 is an intermediate casing 2 and mounted on the top of the intermediate casing 2 is the upper casing member 3. Mounted between the casing members 1 and 2 are the bearings 15 and 16 in which are revolubly mounted the shafts 9 and 13. The shaft 9 is provided on its one end with an enlarged portion $9^a$ which is provided with a square recess adapted for the square end of the ordinary or conventional main shaft that extends from the transmission to the differential. Mounted on this shaft 9, inside of the casings 1 and 2, is the gear 10 which is the low and reverse slide gear which engages the gear 7 when shifted in one direction and engages the pinion 22 which is the reverse pinion when shifted in the opposite direction. This gear 10 is provided with a hub on one side in which is a groove $10^a$ adapted for a shifting lever which extends to a recess $1^c$ in the casing 1 where it is engaged by the lever 25 for shifting the gear 10 on the shaft 9. Mounted on this shaft 9 is also another gear 11 which is provided with an extended hub portion on one side in which is provided a groove $11^a$ adapted for a shifting lever which extends to the recess $1^c$ in the casing 1, where it is engaged by said lever 25. Mounted on this extended hub portion is the clutch member $11^b$ which is adapted to engage a clutch member 12ª secured to the gear 12 on the shaft 13. This gear 12 is secured to the end of the shaft 13 while the gears 10 and 11 are shiftably mounted longitudinally on the shaft 9 and are held from turning thereon by means of keys. It will be here noted that the shaft 13 extends into the shaft 9. Mounted between the casing members 2, and 3 is the counter shaft 4 parallel with the shaft 9 in bearings 14 and 17 and secured on said shaft is a large gear 5 in alinement with and engaging the gear 12 and secured to said shaft 4 is another gear 6 which is the intermediate gear that engages the gear 11 when it is shifted in one direction. Also secured to this shaft 4 is the low speed gear 7 which is adapted to engage the gear 10 when said gear 10 is shifted to the proper relative position, for producing the low speed. On this shaft 4 is also secured the reverse gear 21 which engages an idler pinion 22 which is supported on a shaft 22ª which is journaled on a lug bearing 2ª extending inwardly on the casing 2 as shown best in Fig. 4 of the drawings. This pinion 22 is also adapted to engage with the gear 10 when the gear 10 is shifted into alinement therewith and produces the reverse movement of the shaft 9. Pivotally mounted in the casing 3 and cover plate 20 is a lever 25 and this cover plate 20 is secured over the top hole in the conventional transmission casing. This lever 25 extends downwardly and engages the shifting levers for shifting the gears 10 and 11. In order to hold the shafts and bearings in the transmission there are provided plates 23 and 24 which are secured against the outer surface of the casing for such purpose.

The operation of my transmission mechanism is as follows: The shaft 13 is connected to the ordinary clutch shaft from the engine which is provided with any conventional clutch; the transmission as shown is neutral; when it is desired to throw it into low speed the gear 10 is shifted into engagement with the gear 7; if it is desired to reverse, the gear 10 is thrown into engagement with the pinion 22; when it is desired to operate in the intermediate the gear 10 is positioned as shown and the gear 11 is shifted into engagement with the gear 6; when it is desired to operate in the high speed the gear 11 is shifted so that the clutch member 12ª on the gear 12 engages the clutch member 11ᵇ on the gear 11 and the shaft 9 is driven directly through the clutch in the high speed.

Though I have shown and described a particular construction, combination and arrangement of parts I do not wish to be limited to this particular construction, combination and arrangement but desire to include in the purview of my invention the construction, combination and arrangement substantially as set forth in the appended claims.

Having thus described my invention what I claim as new and desire to secure by Letters Patent, is:

1. In a transmission mechanism, the combination with a conventional planetary transmission casing, of a casing adapted to fit inside of said conventional casing, change speed gears operatively mounted therein and means for shifting portions of said gears.

2. In a transmission mechanism, the combination with the conventional planetary transmission casing, of a casing adapted to fit inside of said conventional casing, change speed gears operatively mounted therein and means for shifting portions of said gears, extending out through the upper side of said casing.

3. In a transmission mechanism, the combination with a conventional planetary transmission casing, of an auxiliary three-member transmission casing adapted to be secured therein and supported thereby and a three-speed and reverse gear transmission mounted therein.

4. In a transmission mechanism, the combination with a conventional planetary transmission casing, of an auxiliary three-member transmission casing adapted to be secured therein and supported thereby, a three-speed and reverse gear transmission mounted therein and ball-bearing means mounted between the several sections of said casing and supporting said three-speed and reverse gear transmission.

In testimony whereof, I have hereunto set my hand at San Diego, California this 6th day of March, 1918.

URIAH L. BARNES.